(12) United States Patent
Pastore et al.

(10) Patent No.: US 11,681,951 B2
(45) Date of Patent: *Jun. 20, 2023

(54) SEMANTIC LEARNING IN A FEDERATED LEARNING SYSTEM

(71) Applicant: INTERNATIONAL BUSINESS MACHINES CORPORATION, Armonk, NY (US)

(72) Inventors: Vito Paolo Pastore, Lecce (IT); Yi Zhou, San Jose, CA (US); Nathalie Baracaldo Angel, San Jose, CA (US); Ali Anwar, San Jose, CA (US); Simone Bianco, San Francisco, CA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/818,132

(22) Filed: Aug. 8, 2022

(65) Prior Publication Data
US 2022/0383132 A1 Dec. 1, 2022

Related U.S. Application Data

(63) Continuation of application No. 17/022,140, filed on Sep. 16, 2020, now Pat. No. 11,494,700.

(51) Int. Cl.
*H04L 29/08* (2006.01)
*G06F 40/30* (2020.01)
(Continued)

(52) U.S. Cl.
CPC ............. *G06N 20/00* (2019.01); *G06F 40/30* (2020.01); *G06N 3/04* (2013.01); *G06N 3/045* (2023.01); *G06N 3/088* (2013.01); *H04L 67/10* (2013.01)

(58) Field of Classification Search
CPC ......... H04L 67/10; H04L 41/16; G06N 20/00; G06N 3/04; G06F 40/30
(Continued)

(56) References Cited

U.S. PATENT DOCUMENTS

| 9,563,854 B2 | 2/2017 | Cruz Mota |
| 10,171,586 B2 | 1/2019 | Shaashua |

(Continued)

FOREIGN PATENT DOCUMENTS

| CN | 108304427 A | * 7/2018 | ........... G06F 16/285 |
| CN | 108632625 A | * 10/2018 | ........... H04N 19/124 |

(Continued)

OTHER PUBLICATIONS

Author Unknown, "Musketeer Machine Learning To Augment Shared Knowledge In Federated Privacy-Preserving Scenarios", downloaded from https://musketeer.eu/ on Sep. 15, 2020, 9 pages.

(Continued)

*Primary Examiner* — Ruolei Zong
(74) *Attorney, Agent, or Firm* — Caleb D. Wilkes

(57) ABSTRACT

A method, a computer system, and a computer program product are provided for federated learning. An aggregator may receive cluster information from distributed computing devices. The cluster information may relate to identified clusters in sample data of the distributed computing devices. The cluster information may include centroid information per cluster. The aggregator may include a processor. The aggregator may integrate the cluster information to define data classes for machine learning classification. The integrating may include computing a respective distance between centroids of the clusters in order to determine a total number of the data classes. The aggregator may send a deep learning model that includes an output layer that has a total number of nodes equal to the total number of the data (Continued)

classes. The deep learning model may be for the distributed computing devices to perform machine learning classification in federated learning.

20 Claims, 9 Drawing Sheets

(51) Int. Cl.
*G06N 20/00* (2019.01)
*H04L 67/10* (2022.01)
*G06N 3/04* (2023.01)
*G06N 3/088* (2023.01)
*G06N 3/045* (2023.01)

(58) Field of Classification Search
USPC .......................................................... 706/12
See application file for complete search history.

(56) References Cited

U.S. PATENT DOCUMENTS

| | | | |
|---|---|---|---|
| 10,348,810 B1 | 7/2019 | Florissi | |
| 10,404,787 B1 | 9/2019 | Florissi | |
| 10,496,926 B2 | 12/2019 | Florissi | |
| 2014/0029839 A1* | 1/2014 | Mensink | G06K 9/6232 382/224 |
| 2019/0042878 A1 | 2/2019 | Sheller | |
| 2019/0138934 A1 | 5/2019 | Prakash | |
| 2020/0019842 A1 | 1/2020 | Kim | |
| 2020/0026732 A1* | 1/2020 | Bequet | G06N 3/08 |
| 2020/0265304 A1* | 8/2020 | Nagaraj Chandrashekar | G06N 3/08 |
| 2021/0390711 A1* | 12/2021 | Richards | G06T 7/248 |

FOREIGN PATENT DOCUMENTS

| | | | | |
|---|---|---|---|---|
| CN | 110084377 A | | 8/2019 | |
| CN | 106708692 B | * | 9/2019 | G06F 11/3006 |
| CN | 106708692 B | | 9/2019 | |
| CN | 110309923 A | | 10/2019 | |
| CN | 108632625 B | | 2/2020 | |
| CN | 108304427 B | | 3/2020 | |
| CN | 110874440 A | | 3/2020 | |
| CN | 110942154 A | | 3/2020 | |
| CN | 111144584 A | * | 5/2020 | |
| CN | 111144584 A | | 5/2020 | |
| CN | 111477290 A | | 7/2020 | |
| CN | 111553470 A | | 8/2020 | |
| CN | 111553745 A | | 8/2020 | |

OTHER PUBLICATIONS

Babajide O. Ayindea, Tamer Inanca, Jacek M. Zuradaa, "Redundant Feature Pruning for Accelerated Inference in Deep Neural Networks," Feb. 2019, National Science Foundation, par.nsf.gov/servlets/purl/10125667 (Year: 2019), 29 pages.

Bonawitz et al., "Towards Federated Learning at Scale: System Design," Proceedings of the 2nd SysML Conference, arXiv:1902.01046v2 [cs.LG] Mar. 22, 2019, 15 pages.

Disclosed Anonymously, "Method and System for Aggregating and Decimating Decision Trees for Allocating Federated Internet-of-Things (IOT) Resources," IPCOM000258344D, Pub. Date May 1, 2019, 3 pages.

Disclosed Anonymously, "Ranking and Automatic Selection of Machine Learning Models," IPCOM000252275D, Pub. Date Jan. 3, 2018. 34 pages.

Disclosed Anonymously, "Recognizing Semantic Formatting Information in a Document," IPCOM000251990D, Pub. Date Dec. 13, 2017, 35 pages.

Guo et al., "Deep Clustering With Convolutional Autoencoders", International Conference on Neural Information Processing 2017, published online Oct. 26, 2017, downloaded on Sep. 15, 2020 from https://xifengguo.github.io/papers/ICONIP17-DCEC.pdf, 10 pages.

Harumichi Yokoyama, Takuya Araki, "Efficient distributed machine learning for large-scale models by reducing redundant communication," Aug. 2017, IEEE, ieeexplore.ieee.org/abstract/document/8397638 (Year: 2017), 8 pages.

International Search Report and Written Opinion of the International Searching Authority, International application No. PCT/CN2021/117126, dated Dec. 8, 2021, 9 pgs.

Konecny et al., "Federated Learning: Strategies for Improving Communication Efficiency," arXiv.org, Cornell University, arXiv:1610.05492v2 [cs.LG] Oct. 30, 2017, 10 pages.

Lim et al., "Federated Learning in Mobile Edge Networks: a Comprehensive Survey," arXiv.org, Cornell University, arXiv:1909.11875v2 [cs.NI] Feb. 28, 2020, 34 pages.

Mell et al., "The NIST Definition of Cloud Computing", National Institute of Standards and Technology, Special Publication 800-145, Sep. 2011, 7 pages.

Pending U.S. Appl. No. 17/022,140, filed Sep. 16, 2020, entitled, "Semantic Learning in a Federated Learning System", 52 pages.

Pu Liang et al., "Think Locally, Act Globally: Federated Learning with Local and Global Representations", arXiv.org, Cornell University, arXiv:2001.01523v3 [cs/LG], Jul. 15, 2020, 34 pages.

Yang et al., "Deep Spectral Clustering Using Dual Autoencoder Network", arXiv:1904.13113v1 [cs.LG], Apr. 30, 2019, 10 pages.

IBM, List of IBM Patents or Patent Applications Treated as Related, Appendix P, dated Aug. 9, 2022, 2 pages.

\* cited by examiner

SEMANTIC LEARNING IN A FEDERATED LEARNING SYSTEM

BACKGROUND

The present invention relates generally to the field of deep learning models, and more particularly to federated learning for deep learning models.

In a federated learning system, a group of multiple devices or parties work together to develop and collaboratively train one deep learning model, e.g., a predictive model, without sharing or revealing the individual party raw data with the other devices or parties that are participating in the training of the model. Because the more data that is processed the better that the model will be trained, doing a deep learning training using multiple parties and their data will lead to a better training and a better model. An aggregator receives information from individual devices or parties and compiles or aggregates the information to fine tune the deep learning model. In some instances, the aggregator averaged the information from the parties in order to tune the deep learning model. In a federate learning system, the data of the various devices in the network can be used to train the model without the devices sharing through the cloud the individual raw data that is on an individual computing device or phone. The aggregator can send a tuned deep learning model to individual devices without those devices receiving raw data from the other devices. Thus, federated learning helps achieve privacy for raw data of an individual device, while still allowing multiple parties to work together to train a deep learning model. Federated learning prevents an adversary from reverting a data transformation to find original raw training data matched with a particular party.

"Towards Federated Learning At Scale System Design" by Bonawitz et al. describes that federated learning ("FL") is a distributed machine learning approach which enables training of a large corpus of decentralized data residing on devices like mobile phones. Bonawitz et al. also says that FL addresses the fundamental problems of privacy, ownership, and locality of data.

U.S. Patent Application Publication No. 2019/0138934 A1 to Prakash et al. discloses that for federated learning each client compute node fetches a global model, updates the global model using its local data, and communicates the updated model to the central server. Prakash et al. discloses, however, that computations should be balanced across heterogenous compute nodes based on knowledge of network conditions and operational constraints experienced by heterogeneous compute nodes.

Known federated learning systems have disadvantages that they are built on assumptions that different parties label the data, that different parties will use the same data labeling, and that the different parties know all of the possible data classes. In practice, parties often will not know the labels used by other parties. A first party may give a label to a sample that is different from the label that a second party would give to that sample. For example, some parties may consider a rabbit to be a pet and others may consider a rabbit to be food. Sometimes parties such as hospitals are not permitted to share their data and labels in advance. Also, new samples may emerge that do not fit well into the static model structure. For example, in a model for recognizing food pictures, a local food such as arepa will be understood by a local party but not by other parties scattered throughout the world. Updating the model structure requires all of the local models to be retrained, which will consume large amounts of time and energy.

SUMMARY

According to one exemplary embodiment, a method for federated learning may be provided. An aggregator may receive cluster information from distributed computing devices. The cluster information may relate to identified clusters in sample data of the distributed computing devices. The cluster information may include centroid information per cluster. The aggregator may include a processor. The aggregator may integrate the cluster information to define data classes for machine learning classification. The integrating may include computing a respective distance between centroids of the clusters in order to determine a total number of the data classes. The aggregator may send a deep learning model that includes an output layer that has a total number of nodes equal to the total number of the data classes. The deep learning model may be for the distributed computing devices to perform machine learning classification in federated learning.

A computer system and a computer program product corresponding to the above method may also be provided according to some embodiments.

With these embodiments, labels for data samples may be accurately and seemly codified in a deep learning system, even if different parties give different names to the same sample type. A deep learning model in federated learning is tailored to semantic meanings of different participants, so that the participants can use their correct unique semantic labels independently while still contributing to the federated learning system.

In an additional exemplary embodiment, the aggregator may provide an autoencoder to the distributed computing devices. Individual computing devices of the distributed computing devices may run sample data of the individual computing devices through the autoencoder to produce autoencoder outputs. The individual computing devices may run the autoencoder outputs through a clustering algorithm to identify the clusters from the sample data. The cluster information may be sent from the distributed computing devices to the aggregator.

With this embodiment, federated learning systems may be improved to have improved accuracy to correctly identify labels and classes for data samples fed into the system.

Another exemplary embodiment may additionally include a step of naming, via a computing device of the distributed computing devices, a class of the classes according to a semantic meaning for the computing device.

With this embodiment, individual parties that are part of a system of distributed computing devices in a federated learning deep learning network may provide their own semantic definitions in order to label groups that are shared by other parties in the network.

A supplementary exemplary embodiment may additionally include a step of anonymizing, via the distributed computing devices, the cluster information before the cluster information is sent to the aggregator.

With this embodiment, privacy of customer data may be maintained so that individual parties can participate in the federated learning without exposing their private customer and other individual raw data.

A further exemplary embodiment may additionally include a step of checking, via a first computing device of the distributed computing devices, for a new class during the federated learning. The checking may include the first computing device feeding a new sample to the autoencoder and performing an anomaly detection to detect the new sample deviating from the classes. The deviating exceeds a pre-defined threshold.

In this way, new classes that emerge during federated learning may be added into the deep learning model in an expedited manner that saves computing resources.

BRIEF DESCRIPTION OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

The following described exemplary embodiments provide a system, method and program product for federated learning enhanced with semantic learning. The present embodiments have the capacity to accurately and seemly codify labels for each participant or party in a federated learning system, even if certain samples have different semantic meanings for the different participants or parties. The present embodiments also enable the addition of new classes into the deep learning model in an expedited manner, without requiring a full retraining that runs through all parties. Thus, the present embodiments save computing and training resources for a federated learning system and allow the federated learning system to improve its adaptability to unique samples and private semantic labels for the samples of each party that participates.

Figure 1:
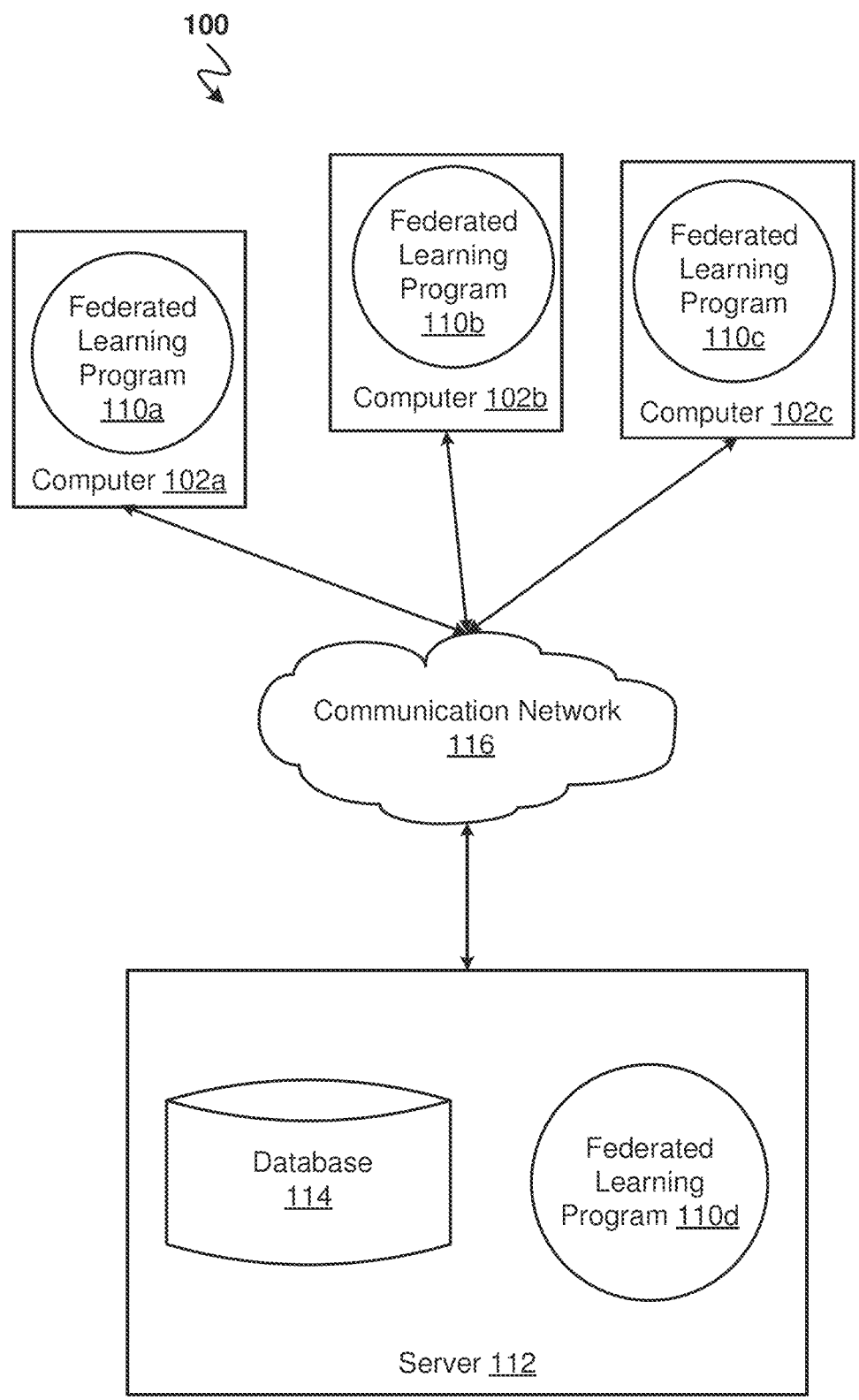
FIG. 1 illustrates a networked computer environment according to at least one embodiment.

Referring to FIG. 1, an exemplary networked computer environment 100 in accordance with one embodiment is depicted. The networked computer environment 100 may be considered in some embodiments to be a federated learning system. The networked computer environment 100 may include a plurality of computers, namely a first computer 102a, a second computer 102b, and a third computer 102c. FIG. 1 shows three such client computers in the networked computer environment 100, but in practice there can be many more such client computers in the networked computer environment 100. As explained below with respect to FIG. 7, each of the first, second, and third computers 102a, 102b, 102c may include one or more processors and memories that are enabled to run and store a federated learning program 110a, 110b, 110c. The networked computer environment 100 may also include a server 112 that is enabled to run a federated learning program 110d that may interact with a database 114 and a communication network 116. The networked computer environment 100 may include a plurality of servers 112, only one of which is shown. The communication network 116 may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The first, second, and third computers 102a, 102b, 102c may communicate with the server computer 112 via the communications network 116. The communications network 116 may include connections, such as wire, wireless communication links, or fiber optic cables. As will be discussed with reference to FIG. 7, server computer 112 may include internal components 902a and external components 904a, respectively, and first, second, and third client computers 102a, 102b, 102c may, respectively, include internal components 902b and external components 904b, respectively. Server computer 112 may also operate in a cloud computing service model, such as Software as a Service (SaaS), Platform as a Service (PaaS), or Infrastructure as a Service (IaaS). Server 112 may also be located in a cloud computing deployment model, such as a private cloud, community cloud, public cloud, or hybrid cloud. The first, second, and third computers 102a 102b, 102c may be, for example, a mobile device, a telephone, a personal digital assistant, a netbook, a laptop computer, a tablet computer, a desktop computer, or any type of computing devices capable of running a program, accessing a network, and accessing a database 114. According to various implementations of the present embodiment, the federated learning program 110a, 110b, 110c, 110d may interact with a database 114 that may be embedded in various storage devices, such as, but not limited to a computer/mobile device 102, a networked server 112, or a cloud storage service.

According to the present embodiment, a user using a client computer or a server computer 112 may use the federated learning program 110a, 110b, 110c, 110d to perform federated learning enhanced with semantic learning for training a deep learning model. The federated learning method enhanced with semantic learning is explained in more detail below with respect to FIGS. 2-9.

The server computer 112 may be considered an aggregator that is part of a federated learning system. For federated learning, the aggregator may issue a query to all available parties in the federated learning system, e.g., the aggregator may issue a query to each of the first, second, and third computers 102a, 102b, 102c in the networked computer environment 100 shown in FIGS. 1 and 5. Each of the parties has their own data set. In a federated learning system, parties cannot see the raw data of the other parties in the system. Each party may have its own local learning model. The query made by the aggregator may be an inquiry as to what the current model parameters of a local learning model are for the individual parties. The query may result in the parties providing some information to the aggregator. The aggregator may ask what the answer to a specific question is based on the data set of the party. Parties may generate their own answer based on their own local data. In some instances, the parties may have a local learning model that is stored and operates within the client computer that helps to generate a reply. The parties generate their reply and send back their replies to the aggregator. After the aggregator receives replies from all parties or from enough of the parties such that a threshold is passed, the aggregator performs an aggregation or a composition of all replies and uses that result to update a machine learning model that is maintained by the aggregator and that is stored and operated in the aggregator computer. After several of these training/tuning sessions or cycles have been performed, then a final machine learning model, e.g., a global model or a neural network, is produced by the aggregator and is shared with all parties, e.g., with the first, second, and third computers 102a, 102b, 102c. The raw data remains at the site of each party. For the embodiment shown in FIG. 1 implemented in a federated learning system, the server computer 112 is configured to submit queries to the first, second, and third computers 102a, 102b, 102c, to perform this aggregation step to generate a global model or a neural network, and then to send a global model or neural network to the first, second, and third computers 102a, 102b, 102c.

Federated learning can be implemented, for example, in an IoT (Internet of Things) network or in a network of smart phones. In these instances, many parties may participate in the training. The data of the various devices in the network can be used to train the deep learning model without the devices having to share through the cloud the individual raw data that is on the individual devices or smart phones. Raw data would include identity data of the parties. Anonymized data in which identity data has been removed may at least in some embodiments not be considered raw data.

In another possible implementation, competitors in the marketplace could work together and use federated learning to train a model while also protecting privacy of the information of their customer. This scenario for competitors working together may include fewer parties helping to train the system as compared to the earlier system described. In this scenario, for example, federated learning could be used by multiple banks to train systems to detect money laundering, without the banks having to share or disclose individual raw banking data of an individual customer.

In another situation, federated learning also may be implemented in instances when individual devices have connectivity constraints and have few chances to share their information to the cloud. For example, a robot on Mars does not have many data transmission opportunities to transmit its data to planet Earth or to satellites orbiting planet Earth. The local device may train a model locally and then may transmit its trained model during its fewer transmission opportunities, instead of transmitting its entire compilation of raw data. The local dataset including features and labels will be kept by the owner/individual party, and other entities in the federated learning system will not be able to access the local dataset of the other parties in the federated learning system.

Federated learning systems are in some instances implemented in predictive typing or predictive speech. Federated learning systems may be implemented to classify images or to classify audio signals.

Federated learning systems may protect the raw data of individual parties from being shared with the other parties by using secure aggregation. When a party has a unique sample to add into the deep learning model, that information may be anonymously provided to the aggregator. Thus, the aggregator may be able to recognize that the sample came from somewhere amongst the parties of the federated learning system, without knowing from which particular party or machine of the federated learning system the sample came. Parties may share model parameters or model weights of the local model and/or of the training sample size with the aggregator. Parties can also share the gradients computed based on the local dataset with the aggregator. If these parameters or weights or gradients alone are shared with the aggregator, then the raw data including features and individual labels may remain private at the computing device of the party.

Figure 2:
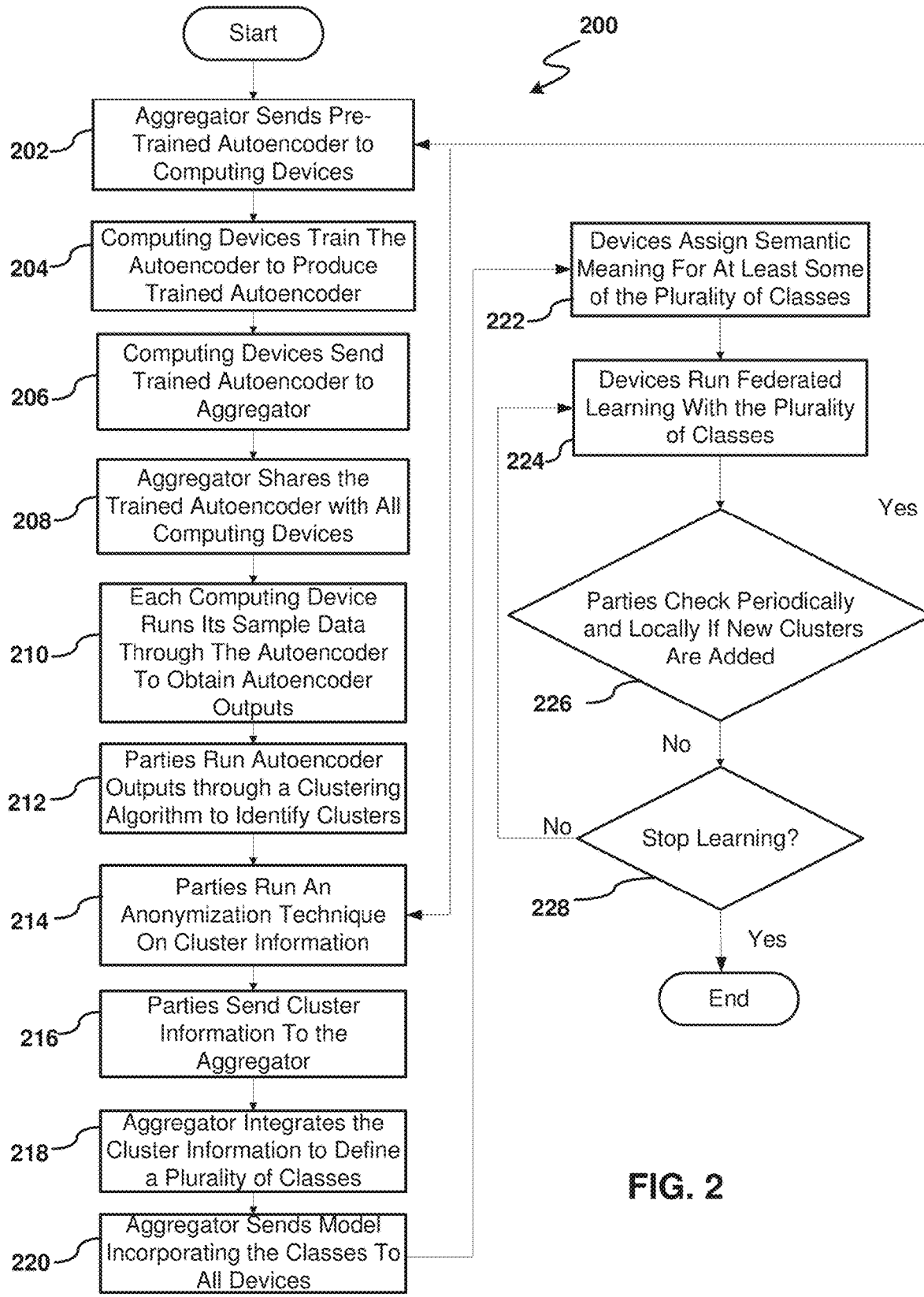
FIG. 2 is an operational flowchart illustrating a process for a federated learning process workflow enhanced with semantic learning according to at least one embodiment.

Referring now to FIG. 2, an operational flowchart illustrating an exemplary process 200 for deep learning enhanced with semantic learning is shown. In this process 200, the federated learning program 110a, 110b, 110c, 110d will take actions according to at least one embodiment.

As depicted in FIG. 2, a process 200 includes an exemplary deep learning process enhanced with semantic learning. The process 200 may begin in a step 202 with an aggregator sending an autoencoder to computing devices of the federated learning system. The autoencoder may be sent via the communication network 116, which as discussed above with respect to FIG. 1 may include various types of communication networks, such as a wide area network (WAN), local area network (LAN), a telecommunication network, a wireless network, a public switched network and/or a satellite network, and may include connections, such as wire, wireless communication links, or fiber optic cables.

This autoencoder may in at least some embodiments be a pre-trained autoencoder. To train a deep learning model, the total number of classes should be fixed and be static and definitions for those classes should be provided. Therefore, for a pre-training of an autoencoder an operator may enter in a number of classes and definitions for those classes based on experiences with previous deep learning models or based on educated guesses regarding the potential samples expected to be received and analyzed with the deep learning model. Training an autoencoder may be unsupervised, however, so that labels are not needed during training. When an image is fed into an autoencoder, an encoder of the autoencoder extracts high-level features from the image. A decoder of the autoencoder may use the extracted features to reconstruct the image. The encoder and decoder together help form the autoencoder. Using a pre-trained autoencoder helps reduce training time and improve performance of the autoencoder. In some instances, the autoencoder may be pre-trained without the number of classes being known. Using a pre-trained autoencoder helps the generalization of the autoencoder.

An autoencoder, described below with respect to FIG. 3, may include a deep learning model. The autoencoder receives data as an input and uses the deep learning model to extract high-level feature vectors from each data sample. The deep learning model may be a neural network, e.g., a convolutional neural network.

In a step 204 of the process 200, the individual computing devices of the federated learning system, for example the first, second, and third computers 102a, 102b, 102c shown in FIG. 1, train the autoencoder that was received in step 202 and as a result produce a trained autoencoder. FIG. 3 which will be described below shows an example of an autoencoder and its components. This training of the autoencoder occurs by the individual parties running or feeding their samples or sample data into the autoencoder as inputs into the learning model of the autoencoder. Then, a loss function is used for each party to gradually adjust the parameters of the learning model of the autoencoder. The loss function is run and produces a loss amount, the parameters are gradually adjusted to try to reduce the loss amount, and the loss function is run again. The loss function measures the performance of the autoencoder.

The step 204 may include sequential training of the autoencoder by the individual computing devices, e.g., by the first, second, and third computers 102a, 102b, 102c, of the federated learning system. In the sequential training, the autoencoder may first be sent to a particular computing device, e.g. to the first computer 102a, which first trains the autoencoder to form a partially trained autoencoder. The first computer 102a may then send the partially trained autoencoder to another computing device, e.g., to the second computer 102b. This other computing device may further train the partially trained autoencoder by feeding its own data into the deep learning model and repeatedly running a loss function for guidance for gradually adjusting the parameters of the deep learning model. The other computing device will produce a further trained autoencoder due to this further training.

This passing of the partially trained autoencoder from one computing device to another computing device may occur directly through the communication network 116 or may occur via the aggregator who receives the partially trained autoencoder and forwards the partially trained autoencoder to the next computing device. This latter scenario will often occur, because in many federated learning systems the parties do not know who the other parties in the federated learning system are and, therefore, will not know how to send another party their partially trained model. Thus, in that embodiment the aggregator will be used to facilitate this transfer, because the aggregator will know and have the information stored as to who the parties/computing devices are in the federated learning system. Whether the aggregator is used as a facilitator for the transfer or whether the parties know about the other parties and can directly transfer, this autoencoder training by one party after the other may be considered a sequential training.

The second computer 102b may pass or send the further trained autoencoder to an additional computing device, e.g., to the third computer 102c. This passing may occur directly or via the aggregator as explained above, and either way could use the communication network 116. The additional computing device may feed its sample into the further trained autoencoder and run the loss function to guide gradual adjustment of the deep learning model parameters. This additional training may produce a trained autoencoder or an autoencoder ready to disburse to all parties.

This training or sequential training of the autoencoder may in some embodiments be performed throughout every computing device or party of the federated learning system before the aggregator requests the autoencoder. Alternatively, the aggregator may request the autoencoder after the autoencoder has been trained by a majority of the devices/parties of the federated learning system. This use of training by a majority will save some time and resources as compared to the embodiments where all parties help train the autoencoder.

During the sequential training of the autoencoder, the autoencoder itself including its neural network/learning model is passed from party to party, but not the raw data including the raw features and the raw labels. The sequential training of the autoencoder by the parties may also be considered as a collaborative training of the autoencoder by the parties.

In a step 206, the computing devices send the trained autoencoder back to the aggregator. This sending may occur via the communication network 116. In at least some embodiments, the last computing device, e.g., the third computer 102c shown in FIG. 1, will send the autoencoder back to the aggregator. If the aggregator requests the autoencoder after a majority but not all of the parties have trained the autoencoder, then the party to send the autoencoder to the aggregator will not be the last of all of the parties of the autoencoder.

In at least some embodiments, for the steps 202-206 which are all related to the training of the autoencoder, no clustering techniques are needed or are performed. In these embodiments for the process 200, there is no need in these steps 202-206 to submit the sample data through a clustering algorithm.

After the aggregator receives the trained autoencoder back from the computing devices of the federated learning system, in a step 208 the aggregator shares the trained autoencoder with the computing devices, e.g., with all of the computing devices of the federated learning system. This sharing may occur via the communication network 116. When the training of the autoencoder by the parties occurs sequentially, this sharing of the final trained autoencoder with all parties gives all parties the benefits of the complete training of the autoencoder that was performed by all parties or by a majority of the parties or by a certain number of the parties. This sharing gives an improved autoencoder to each party as compared to an autoencoder that was trained on the data by one party alone.

In at least some embodiments, the autoencoder will include a clustering algorithm. In various embodiments, the clustering algorithm may be a K-means clustering algorithm, a mean-shift clustering algorithm, a density-based spatial clustering of applications with noise (DB SCAN), an expectation-maximization (EM) clustering using gaussian mixture models (GMM), or an agglomerative hierarchical clustering.

In a step 210, each computing device, e.g., each of the first, second, and third computers 102a 102b, 102c, runs its sample data through the trained autoencoder to produce autoencoder outputs. The autoencoder outputs may be high-level representations of the input data and may, in particular, be vectors. The vectors may include multiple variables or parameters, e.g., three or more variables or parameters and even up to 100 or more variables or parameters. These variables or parameters may be referred to as feature values. In a deep learning model that identifies pictures of animals, the autoencoder may recognize various features about each image such as size, number of appendages, ear shape, etc. that may help a deep learning model to classify an animal. These features may be the variables or parameters that are determined by feeding the samples through the autoencoder which analyzes the sample. In the embodiment where images are fed to the autoencoder, the autoencoder analyzes the image and can analyze pixels of the image.

In the step 212, each computing device, e.g., each of the first, second, and third computers 102a 102b, 102c, runs the autoencoder outputs through a clustering algorithm to identify clusters in the sample data. A clustering algorithm may be present in each computing device. Alternatively, a clustering algorithm may be present in the autoencoder that is received from the aggregator. The clustering algorithm may in some embodiments be a K-means clustering algorithm, a mean-shift clustering algorithm, a density-based spatial clustering of applications with noise (DBSCAN), an expectation-maximization (EM) clustering using gaussian mixture models (GMM), or an agglomerative hierarchical clustering. FIG. 3 shows an example of an autoencoder that is paired with a feature of passing autoencoder output through a clustering algorithm. An upper portion of FIG. 3 shows an example of clusters that were generated from output samples being ran through a clustering algorithm.

Feeding the autoencoder outputs through the clustering algorithm will produce a respective data point for each autoencoder output, i.e. a data point representing each sample. These data points may be charted in a graph. For example, in an autoencoder model with three features, a three-dimensional graph may be used to chart the data points. Data points that generally fall close together on the three-dimensional graph will generally be considered to belong to a particular cluster of the data. In at least some embodiments, each cluster of sample data or of the autoencoder outputs will have a centroid, i.e. a center of the cluster, and will have a radius. Data points that are a disposed in the chart a distance from the centroid that is smaller than the radius would be considered to belong to that cluster. An upper portion of FIG. 3 shows an example of a number of clusters of data points and shows a centroid and a radius of a particular cluster. An autoencoder model with three features that may be paired with a three-dimensional graph in a clustering algorithm are used as an example for simplicity and to explain the concept more easily. In many autoencoder models that will be used, the autoencoder model will use many more than three features. For example, the autoencoder model may include up to one hundred or more features. Clustering techniques are still achievable with these models having more features.

In a step 214 of the process 200, the parties, e.g., the first, second, and third computers 102a, 102b, 102c, run an anonymization technique on the cluster information that was generated by the clustering algorithm. This anonymization results in a private representation of the autoencoder output being generated. The anonymization technique may be a generalization technique. For the anonymization technique, identity attributes, e.g., explicit identifiers, may be removed from the cluster information. Therefore, when the aggregator receives a set of anonymized cluster information from a party of the federated learning system, the aggregator may not be able to recognize which party sent the set of cluster information, although the aggregator may be able to recognize that the sending party belongs to their federated learning system. For example, any name of the party who generated the cluster information may be removed from the cluster information before the cluster information is sent to the aggregator.

Various anonymization techniques may be performed according to step 214. In a suppression anonymization technique, a tuple or attribute value is replaced with special anonymous symbols such as "**". Thus, with suppression anonymization an original data value is replaced with some anonymous value throughout the cluster information. In a generalization anonymization technique, attribute values are replaced with semantically unvarying but less particular value. For example, if party identifying information included information about the location of the party/participant, the city or state of the party may be replaced with the country of the location of the party/participant. In a bucketization anonymization technique, sensitive information is maintained but is separated or compartmentalized from any identifying information. Therefore, with bucketization anonymization the aggregator may receive features from sample data but will not be able to recognize from which party some specific sample data came. In a perturbation anonymization technique, sensitive information is not deleted but is altered randomly. Therefore, the altered information received by the aggregator is not correct and the aggregator knows which information was altered, but outside parties would not know which information was altered. Slicing anonymization may be performed by horizontally and vertically partitioning columns/rows of information and then randomly sorting the partitions, so that the final information sent has features grouped together, but not in a way that fully links an information set. Slicing anonymization may be further supplemented with encryption of sensitive features.

In a step 216 of the process 200, the parties, e.g., the first, second, and third computers 102a, 102b, 102c, send the cluster information to the aggregator, e.g., to the server computer 112. The parties may use the communication network 116 to send this cluster information. The cluster information may have been anonymized before being sent.

In a step 218 of the process 200, the aggregator, e.g., the server computer 112, integrates the cluster information to define a plurality of classes. This integration is a way of processing the cluster information. The integrating performed by the aggregator may include identifying any redundant clusters amongst the identified clusters and may include the feature that a number of the classes that are defined correspond to a total number of the clusters from the distributed computing devices reduced by any redundant clusters. In at least some embodiments, the cluster information may include centroid information that relates to the centroids of the clusters and the aggregator may compare the centroid information to identify any redundant clusters. For example, if centroids from various parties lie within a distance smaller than a pre-defined new cluster threshold distance, then the aggregator may consider the centroids to belong to redundant clusters that should be consolidated or merged for the tally of classes. Additionally or alternatively, if a radius of a first cluster overlaps a radius of a second cluster, then the aggregator may consider the centroids having the respective radius to belong to redundant clusters that should be consolidated for the tally of classes. The aggregator may determine the distances between each centroid received and every other centroid that is part of the cluster information of all groups of the federated learning system. Also, the aggregator may run a fresh clustering technique on the cluster information to identify the total number of clusters. This fresh clustering is particularly likely if the cluster information has been anonymized in step 214, because the aggregator will have access to feature information although the aggregator will not know from which parties the particular feature information came. For a K-means clustering technique performed here, no pre-defined threshold distance between centroids needs to be chosen, because the K-means clustering algorithm can hash out and determine what groups of data points constitute a separate cluster.

Figure 6:
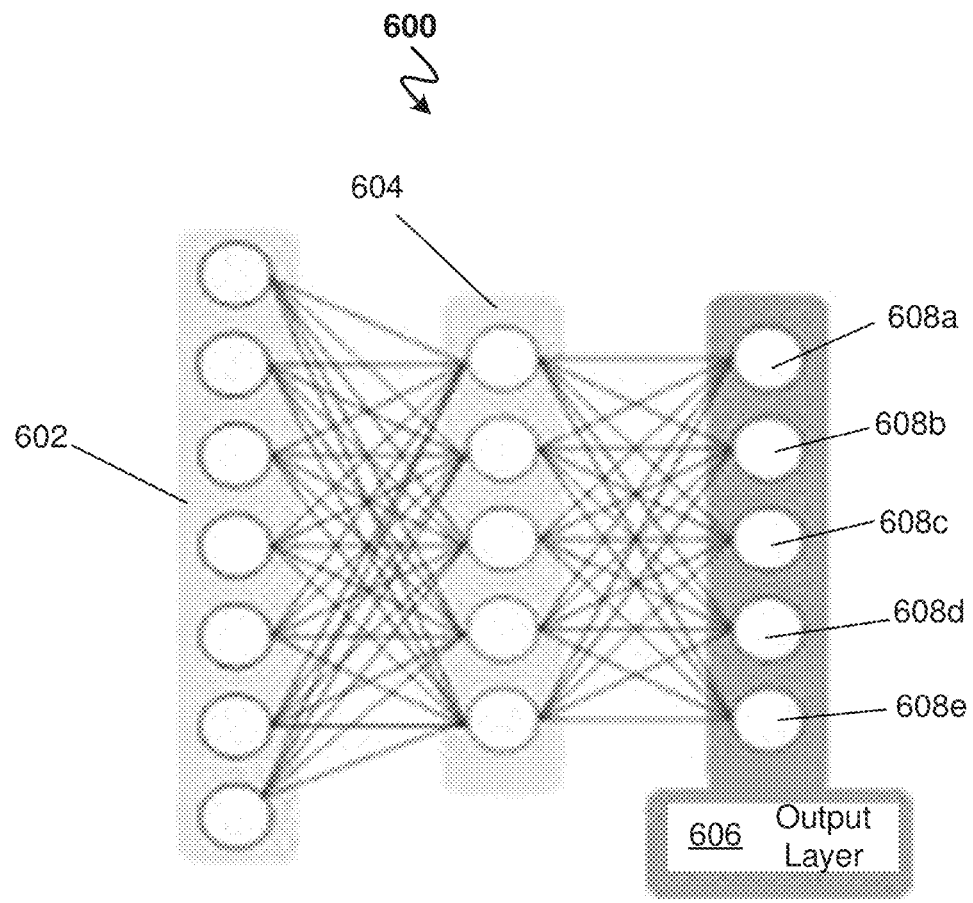
FIG. 6 shows an example of layers of a deep learning model.

In a step 220 of the process 200, the aggregator, e.g., the server computer 112, sends to all computing devices in the federated learning system, e.g., to all of the first, second, and third computers 102a, 102b, 102c, a deep learning model that incorporates the plurality of classes. The aggregator may use the communication network 116 to send this deep learning model. This deep learning model may in at least some embodiments be a neural network, e.g., a convolutional neural network. The deep learning model includes an output layer having nodes. The nodes correspond to the defined classes that were defined in step 218. FIG. 6 will be discussed below and illustrates an example of layers of a deep learning model, including an output layer having nodes. Due to the integration from step 218 and the insertion of class data into the model that is sent in step 220, it may be considered that the parties collaboratively train the deep learning model. In the first instance of performing step 220, the deep learning model mentioned above will typically be sent alone. As part of this step 220 in subsequent cycles of performing the process 200, in addition to sending an updated deep learning model the aggregator may also send an updated autoencoder into which new classes have been incorporated. Step 226 which will be described below explains a possible need for another updated autoencoder to be sent to the individual parties, if new classes are later found.

In a step 222 of the process 200, the computing devices, e.g., the first, second, and third computers 102a, 102b, 102c, assign a new semantic meaning for at least some of the plurality of classes. In the example of the model learning to recognize images such as animal pictures, if a party considers a rabbit to be food and the aggregator has identified rabbits as one of the classes for the model, then that party may assign "food" to be the label for this category after receiving the classes from the aggregator. If another party in the same federated learning system considers a rabbit to be a pet, then that party may assign "pet" to be the label for this category after receiving the classes from the aggregator. The system will still function to perform federated learning, even though that first party and the other party have unique and differing semantic labels for the same class of samples.

In a step 224 of the process 200, the computing devices, e.g., the first, second, and third computers 102a, 102b, 102c, run federated learning with the plurality of classes. Therefore, the computing devices receive new samples and feed these new samples into the deep learning model that was received from the aggregator. Regularly, the computing devices will transmit the results of their deep learning training to the aggregator. This transmission of the deep learning results may occur via the communication network 116. Federated learning, as described above, occurs when parties in the system share data to train a model/system, while still preserving privacy of their raw data. Anonymized data, but not raw data, may be sent for federated learning. Thus, some information is shared to achieve the model training, but raw sample data is not shared with the aggregator or with the other parties. As part of step 224, the aggregator may receive from the distributed computing devices one or more results of the federated learning that was performed by the distributed computing devices.

In a step 226 of the process 200, the parties check periodically and locally to determine if new clusters are added. To perform this check, the parties may feed the new samples to an updated autoencoder that they received from the aggregator in step 220. In the autoencoder feature space, anomaly detection is performed to detect significant deviation of any new data point/feature from the clusters for the known classes. For the anomaly detection, a distance from a data point for a new sample to centroids of the other clusters may be measured. The new data point may be considered an anomaly when that distance exceeds a pre-defined threshold. A distance from a data point for a new sample to the closest other known data point of the other clusters may be measured, and the new data point may be considered an anomaly when that distance exceeds a pre-defined threshold. Other clustering algorithms may be used to perform anomaly detection. Numerous anomaly detection techniques such as density-based techniques may be implemented. When the number of anomalies is significantly high, either with respect to an average number of anomalies in a period of time or to a number of total test samples, a flag or warning message may be sent to the aggregator to warn the aggregator of a need to redefine the classes. Alternatively, a flag or warning message may be sent to the aggregator to warn the aggregator of a need to redefine the classes when a single new data point outside of existing classes is confirmed by a party locally. A sample may be considered as belonging to a new cluster if a deviation of the sample from the existing classes exceeds a pre-defined threshold. Information for the new data class itself may be sent along with the warning signal. This new data class information may be used to notify the aggregator and may be used by the aggregator to help retrain an autoencoder beginning with step 202, or this new data class information may skip over the first autoencoder training and be part of a re-integration of cluster information in step 218 to define a new set of classes. This cluster information regarding the new potential cluster may be anonymized by the party before being sent with the warning flag to the aggregator. In another words, step 214 may be repeated at that point before the cluster information regarding a new possible cluster is sent to the aggregator. The aggregator may add a new class to the classes to form a new set of classes. The new class corresponds to the new sample. The new set of classes may be sent from the aggregator to the distributed computing devices. Additional federated learning may then be performed via the aggregator and the distributed computing devices to further train the deep learning model. The performing of the additional federated learning includes using the new set of classes as new nodes of the output layer of the deep learning model.

To perform step 226, the data samples are fed to the updated autoencoder. To perform step 224, the data samples are fed to the deep learning model that was received from the aggregator. Therefore, in some instances and times during the process 200 the data samples may be fed in parallel to both the updated autoencoder and to the deep learning model.

In a step 228 of the process 200, a check is performed as to whether the deep learning should be stopped for the system or just for a particular device of the federated learning system. If the check results in an affirmative decision for stopping, then the deep learning and the federated learning may be stopped as a whole for the entire federated learning system or may be stopped for an individual device of the federated learning system. If the check results in a negative decision for stopping, then the process may loop back to step 224 where the federated learning continues and then to step 226 where another check for a new cluster is performed. In a default setting, the step 228 will be given an affirmative answer to continue the deep learning/the federated learning. As a part of a step 228, the federated learning program 110a, 110b, 110c may generate and provide a graphical user interface (GUI) prompt to ask a user of the computing device if the deep/federated learning is to be stopped. If a user provides an affirmative answer into the GUI, the individual computing device may send a message to the aggregator to notify the aggregator of same. In many embodiments, the identifying of new labels/classes will be an automated process performed by an individual computing device. The identifying may be a result of new data points being added to the training dataset, some data samples being consistently misclassified, or the party deciding that they want to increase the number of local clusters due to external knowledge.

With the process 200, models may be trained in a federated learning process while allowing a semantic label to be provided by individual parties and while avoiding additional manual intervention or pre-processing that can be expensive. The process 200 may also be implemented for two different domains that have collected samples of interest but that do not have the same labels.

The autoencoder may, for example, be a vanilla autoencoder, a sparse autoencoder, a multilayer autoencoder, or a convolutional autoencoder. In at least one embodiment, the autoencoder may be a feedforward, non-recurrent neural network that has input layers, output layers, and one or more hidden layers connecting the input layers to the output layers. The output layer may have the same number of nodes as the input layer. The output layers help reconstruct the inputs. Autoencoders may, in at least some embodiments, be considered an unsupervised learning model which does not require a labeled input to enable deep learning.

Figure 3:
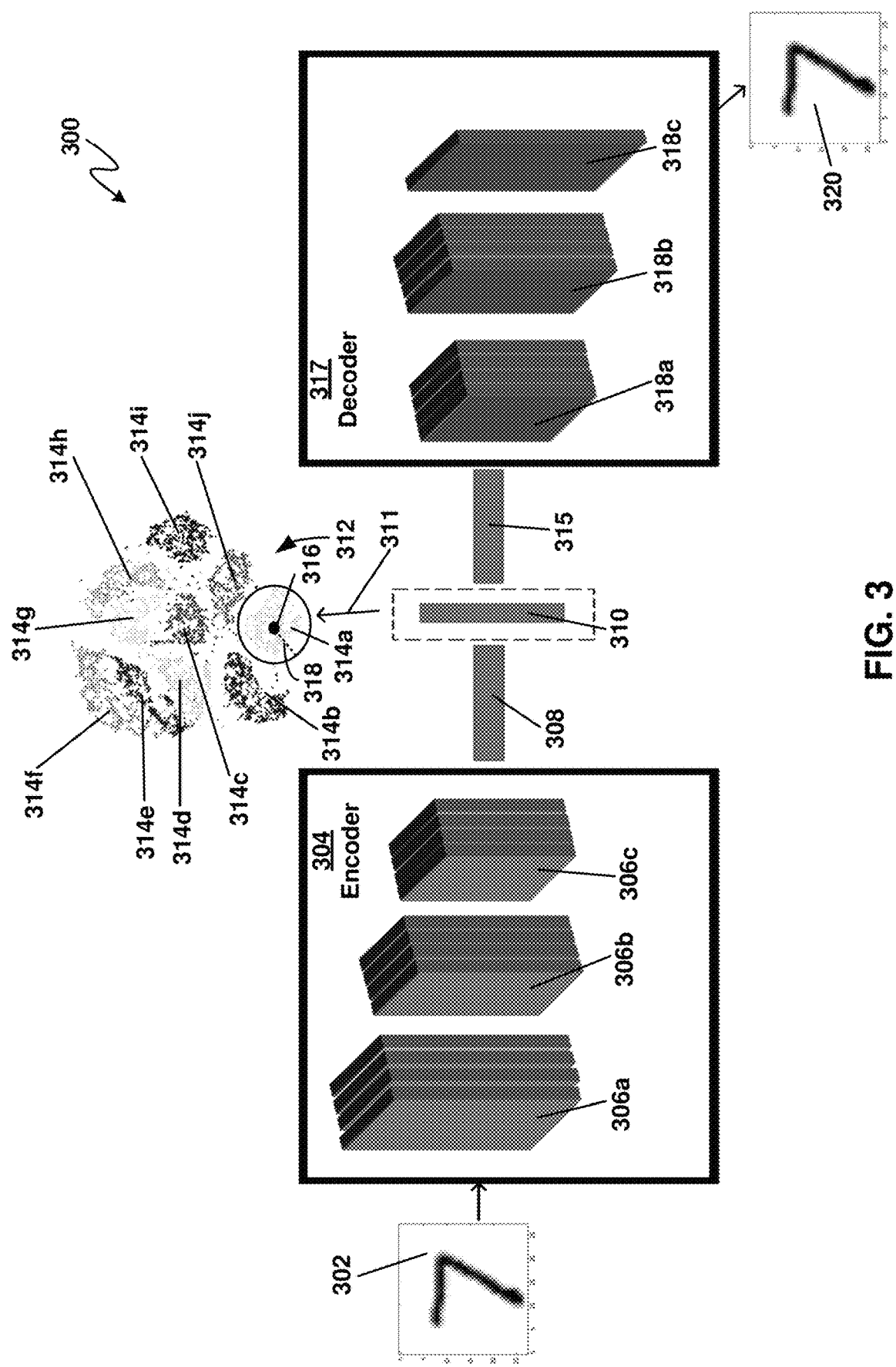
FIG. 3 shows a structure of an autoencoder and a clustering technique being implemented according to at least one embodiment.

FIG. 3 shows a structure of an autoencoder 300 used in at least one embodiment according to the invention. The autoencoder 300 will usually include an encoder 304 and a decoder 317 which encode and decode sample data 302.

The encoder 304 encodes the sample data 302 to generate vectors and embeds the sample data 302 into a latent space. The vectors are high-level representations of the sample data 302. In one embodiment, the sample data 302 are images of animals and the autoencoder generates vectors which classify features of the animal images. The encoder 304 includes a first filter 306a, a second filter 306b, and a third filter 306c as input layers of the autoencoder 300. The sample data are progressively reduced as they advance through the series of filters of the first filter 306a, the second filter 306b, and the third filter 306c. In a flattening layer 308, the autoencoder 300 may flatten the output of the encoder 304 into the required dimensions for the output. The flattening layer 308 produces vectors which are fed to an embedded layer 310. The embedded layer 310 may produce embedded points which may be fed into a clustering algorithm 311 to produce a clustering diagram 312. The embedded points may be considered autoencoder output. In at least some embodiments, dimensionality of the autoencoder output is reduced before the autoencoder output is passed through the clustering algorithm 311.

The embedded data may be passed through the clustering algorithm 311 to produce a clustering diagram 312. The clustering algorithm 311 may be included as part of the autoencoder 300 or may be a separate component of an individual host computing device that is running the autoencoder. In some embodiments, a clustering algorithm layer may be connected to the embedded layer 310. The clustering diagram 312 shown in FIG. 3 is produced via a K-means clustering algorithm. When a K-means clustering algorithm is used, a k value may be chosen or computed as a heuristic representing an expected number of classes. Adjustments with a k value may then be performed as necessary to reduce a loss function. In one example, k is chosen or computed as ten. When the k is chosen, the k value may be input as an argument into the clustering algorithm. At least one embodiment may include a fuzzy k-mean clustering approach, because a deep clustering may require knowing the number of classes in advance. When the k is computed by an algorithm, a partition entropy algorithm, a partition coefficient algorithm, or other algorithms may be used.

The vectors may be passed back through an expansion layer 315 and then may be fed to the decoder 317 that has a first decoding layer 318a, a second decoding layer 318b, and a third decoding layer 318c. Feeding the expanded vectors through the first decoding layer 318a, the second decoding layer 318b, and the third decoding layer 318c helps reconstruct the original input data. The reconstructed images are output as an output sample data set 320.

FIG. 3 shows a clustering diagram 312 according to at least one embodiment. This clustering diagram may be generated by an individual computing device of the federated learning system. By generating the clustering diagram, the individual computing device may generate cluster information for each cluster. The cluster information may be passed to the aggregator, for example, in step 216 of process 200 that is shown in FIG. 2. Alternatively, as is shown in FIG. 4 a system clustering diagram 400 may be generated by the aggregator after the aggregator receives clustering information from the individual computing devices of the federated learning system.

The clustering diagram 312 shown in the upper portion of FIG. 3 shows that when a party has fed its samples into the autoencoder 300, ten clusters were generated, namely clusters 314a-j. Cluster 314a is shown as having a centroid 316 and a radius 318. All sample points/vectors which lie a distance from the centroid 316 which is less than the length of the radius 318 may be considered as belonging to the cluster 314a. The end of the radius 318 represents a boundary of the cluster 314a. It is possible that no sample points/vectors belonging to the cluster 314a lie at the centroid 316, because the centroid 316 is an average of the sample points/vectors that belong to the cluster 314a. Although only cluster 314a is shown in FIG. 3 as having a centroid 316 and a radius 318, in practice all of the other clusters 314b-j will also have their own respective centroid and their own respective radius. Cluster information about the clusters 314a-j and about all of their centroids and radii, respectively, may be sent from an individual computing device to the aggregator in step 216 of the process 200 shown in FIG. 2. This feature of using centroid information as part of the cluster information instead of using individual raw data samples as part of the cluster information helps protect privacy of the individual raw data of each party. Even if the aggregator can reconstruct a centroid using the centroid information, the aggregator is still usually unable to find the individual data points or is unable to match individual data points with any particular party that participates in the federated learning system.

Figure 4:
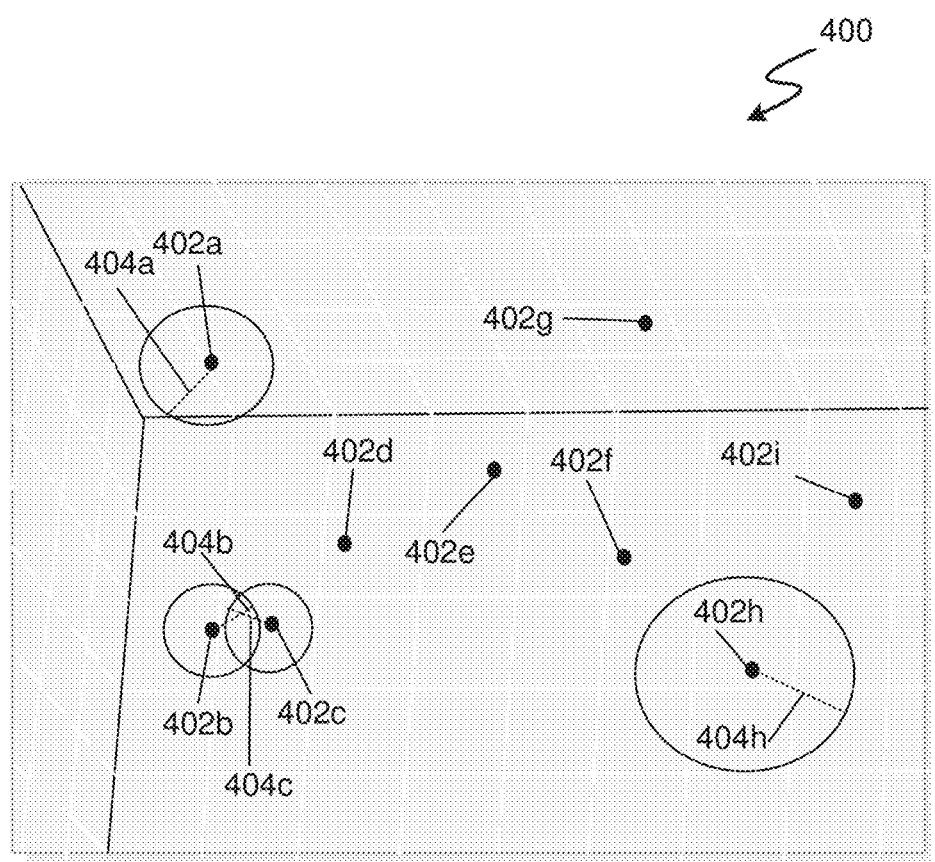
FIG. 4 shows an example of cluster information integration according to at least one embodiment.

FIG. 4 shows an example of a system clustering diagram 400, in which clusters and/or cluster information from all devices of a federated learning system have been combined or integrated together by the aggregator. In the embodiment shown in FIG. 4, the aggregator initially integrated nine clusters that were received from the total distributed or total individual computing devices. To help the raw data not be shared with other parties, the individual computing devices had passed centroid information and radius information to the aggregator, but not the individual raw data and not the individual data points from the clustering diagram 312. Therefore, FIG. 3 shows centroids and radii for the clusters, and not the individual data points. The individual computing devices may also pass information about the number of data points belonging to each cluster. In FIG. 3, centroids 402a-402i are shown. Each of the centroids 402a-402i will also have its own radius, although for simplicity sake the radii 404a, 404b, 404c, and 404h are shown that are associated with the centroids 402a, 402b, 402c, and 402h. The aggregator will check and, in one embodiment with a particular threshold value, the two clusters associated with centroids 402b and 402c will be identified as being redundant to each other because a distance between their respective centroids 402b, 402c is less than the threshold. In some embodiments, a threshold value of 0.5, 1.0, or 1.5 may be chosen. Alternatively, the aggregator may recognize that the radius 404b for the cluster associated with the centroid 402b overlaps the radius 404c for the cluster associated with the centroid 402c, and for that reason may consider the two clusters associated with the centroids 402b and 402c as being redundant to each other.

Therefore, in generating the deep learning model to send to all parties or participants or individual distributed computing devices of the federated learning system as occurs with steps 218 and 220, the aggregator will combine the two clusters associated with the two centroids 402b and 402c into a single cluster or a single centroid. The aggregator may simply designate the new centroid for placement at a halfway point between the two centroids 402b and 402c. The aggregator may alternatively give greater weight to that of the two centroids 402b and 402c which has the greater number of data points. Thus, in the embodiment of FIG. 4 the aggregator will provide a total of eight output nodes in the output layer of the deep learning model. In some instances, the output layer would be referred to as a logits layer. These eight output nodes correspond to the total number of clusters identified by the individual parties or by the individual distributed computing devices, but with that number being reduced by one due to the clusters and their centroids 402b and 402c being considered redundant and being considered to be the same cluster.

FIG. 4 shows that the radii 404a and 404h are larger than the radii 404b, 404c. The size of the radius may depend on the scattering of data points and on the presence or lack of other clusters or centroids in the vicinity.

Figure 5:
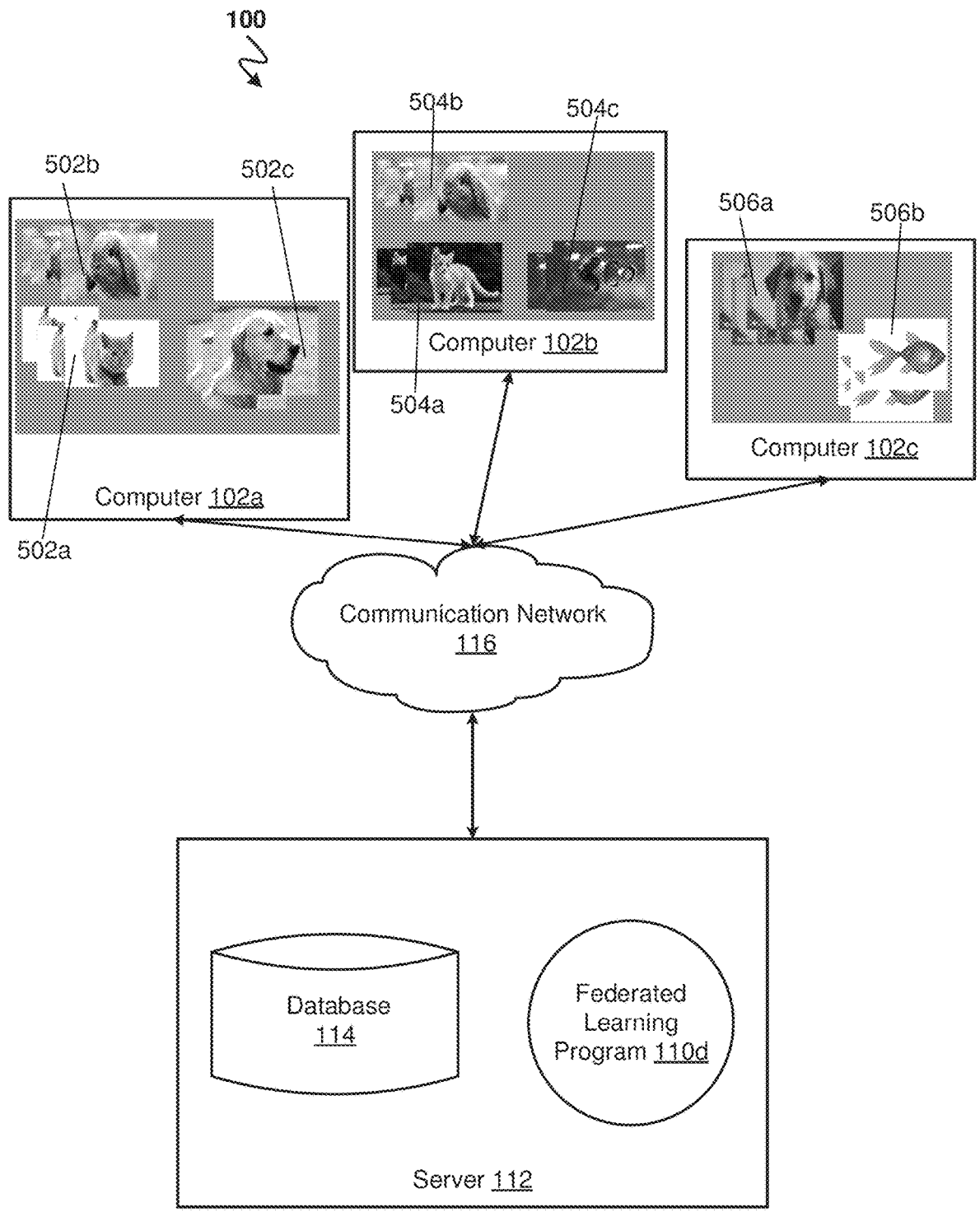
FIG. 5 illustrates a networked computer environment according to at least one embodiment in which individual computing devices of the federated learning network are loaded with data samples organized into clusters.

FIG. 5 shows the networked computer environment 100 that was seen in FIG. 1, but in this instance the first, second, and third computers 102a, 102b, 102c are loaded with image groups from the data samples. In this embodiment, the deep learning model is to be trained to recognize animal pictures. Each image will have its own label provided by the individual computing device. The first computer 102a has a first computer first image group 502a, a first computer second image group 502b, and a first computer third image group 502c. In the embodiment shown, the first computer first image group 502a is a collection of cat pictures. The first computer second image group 502b is a collection of rabbit pictures, but the participant operating the first computer 102a considers rabbits to be "food". The first computer third image group 502c is a collection of dog pictures. The second computer 102b has a second computer first image group 504a, a second computer second image group 504b, and a second computer third image group 504c. In the embodiment shown, the second computer first image group 504a is a collection of cat pictures. The second computer second image group 504b is a collection of rabbit pictures, but the participant operating the second computer 102b considers rabbits to be "pets". The second computer third image group 504c is a collection of fish pictures. The third computer 102c has a third computer first image group 506a and a third computer second image group 506b. In the embodiment shown, the third computer first image group 506a is a collection of dog pictures. The third computer second image group 506b is a collection of fish pictures.

These image groups have been made by the individual computing devices, e.g., by the first computer 102a, the second computer 102b, and the third computer 102c, running their individual data samples of images through a trained autoencoder received from the aggregator, e.g., received from the server computer 112 that has a federated learning program 110d. The autoencoder provides autoencoder outputs which when fed through a clustering algorithm 311 will generate clusters 314 representing the image groups.

When cluster information regarding the clusters 314 are passed to the aggregator, the aggregator integrates the cluster information to identify a total number of classes for the deep learning model. Although the cat images from the first computer first image group 502a are not identical to the cat images from the second computer first image group 504a so that the data points and their cluster centroids of the two received clusters are not identical, the aggregator recognizes that these two clusters overlap and are redundant and combines them into a single cluster. Although the fish images from the second computer third image group 504c and from the third computer second image group 506b are not identical so that the data points and their cluster centroids are not identical, the aggregator recognizes that these two clusters overlap and are redundant and combines them into a single cluster. Although the dog images from the first computer third image group 502c and from the third computer first image group 506a are not identical so that the data points and their cluster centroids are not identical, the aggregator recognizes that these two clusters overlap and are redundant and combines them into a single cluster.

The rabbit images from the first computer second image group 502b and from the second computer second image group 504b are similar or identical to each other, but the first computer 102a named its rabbit group as "food" and the second computer 102b named its rabbit group "pets". The aggregator may analyze the cluster information including the centroid and optionally a radius and number of data sample to recognize that the first computer second image group 502b and the second computer second image group 504b will belong to the same cluster because these two clusters overlap and are redundant. The aggregator combines these two groups into a single cluster. Alternatively, in the first passing of the cluster information from the first, second, and third computers 102a, 102b, 102c to the aggregator the clusters are not labeled, so that even if the operators of the first computer 102a and the second computer 102b have unique semantic meanings for their groups/clusters the aggregator correctly recognizes overlapping and redundancy of clusters by analyzing and integrating the cluster information. In that regard, it is not necessary to have performed labeling of classes in order to train the autoencoder 300.

The aggregator recognizes that a total number of clusters received from the distributed computing devices, in this case from the first, second, and third computers 102a, 102b, and 102c, is eight—three from the first computer 102a, three from the second computer 102b, and two from the third computer 102b. Although the total number of clusters received was eight, the aggregator reduced that number based on the number of pairs of redundant clusters that were identified. Because the aggregator determined that four pairs of clusters were redundant, the aggregator reduced the total number of clusters (eight) by four to achieve a total number of four classes for the deep learning in the federated learning system. The two cat groups were considered to be redundant to each other. The two rabbit groups were considered to be redundant to each other. The two dog groups were considered to be redundant to each other. The two fish groups were considered to be redundant to each other. Thus, by performing the integration and analysis of the cluster information, the aggregator recognizes that a total number of clusters for this embodiment of the deep learning model is four.

The aggregator then generates a deep learning model with four output nodes to pass to the distributed computing devices, in this case to the first, second, and third computers 102a, 102b, and 102c. For example, FIG. 6 shows a deep learning model 600 with a first input layer 602 and a second input layer 604 and an output layer 606. The output layer 606 in a first instance would have four nodes to correspond to the four classes determined through the integration performed by the aggregator. The first node 608a would be for a cat class of images. The second node 608b would be for a rabbit class of images. The third node 608c would be for a dog class of images. The fourth node 608d would be for a fish class of images.

After the aggregator passes the deep learning model 600 to the distributed computing devices in the step 220, in this instance according to FIGS. 5 and 6 to the first, second, and third computers 102a, 102b, and 102c, the distributed computing devices have an opportunity in the step 224 to name the received classes according to their own semantic preference or meaning.

The first computer 102a can name the first three classes—"cat", "food", and "dog", while leaving the fourth class blank, because it has no samples that belong to the fourth class. The aggregator may also send generic labels for the various classes, such as class 1, class 2, class 3, class 4, etc. Alternatively, if the aggregator sends the classes filled with names, the first computer 102a could leave the name for the fourth class that was provided by the aggregator, e.g. could leave the "fish" name for the fourth class, while still renaming the second group (the rabbit group) according to its own semantic meaning for "food" because they believe that rabbits are to be eaten.

The second computer 102b can name the first, second, and fourth classes, respectively,—"cat", "pet", and "fish", while leaving the third class blank, because it has no samples that belong to the third class, in this instance to the dog class. Alternatively, if the aggregator sends the classes filled with names, the first computer 102a could leave the name "dog" for the third class that was provided by the aggregator, while still renaming the second group (the rabbit group) according to its own meaning that rabbits are to be kept as pets. The naming applies for sample fitting performed by the computing devices.

The third computer 102a can name the third and fourth classes—"dog" and "fish", while leaving the first and second classes blank, because it has no samples that belong to the first class or to the second class and has no samples that belong to the rabbit cluster or to the cat cluster. Alternatively, if the aggregator sends the classes filled with names, the first computer 102a could leave the names for the first and second classes that were provided by the aggregator, e.g., "cat" and "rabbit", while also accepting the names dog and fish that the aggregator provided for the third and fourth classes.

Following the embodiments described above shown in FIGS. 5 and 6, if in a further step 226 one of the distributed computing devices, e.g., the first computer 102a, received samples of images of birds and fed those images into an updated autoencoder received from the aggregator, the updated autoencoder at the first computer 102a can recognize that the bird samples do not lie near any of the other four clusters. In a feature space of the updated autoencoder, anomaly detection may be performed to detect significant deviation from the four clusters for the four known classes. When the number of anomalies is significantly high, either with respect to an average number of bird images input in a period of time or to a number of total test samples, a flag may be sent to the aggregator to warn the aggregator of a need to redefine the classes. In some embodiments, a flag may be sent to the aggregator to warn the aggregator of a need to redefine the classes when a first data point is detected as an anomaly.

The aggregator may integrate the clustering information regarding the new bird images cluster with the other cluster information to verify that a new cluster should be created. If the aggregator is satisfied with the verification, for example, due to agreement that the bird image centroid is not close to any of the other centroids, then the aggregator may add a fifth node 608e to the deep learning model 600 and to the updated autoencoder and may send this updated deep learning model and the updated autoencoder to all distributed computing devices in the federated learning system, e.g., to all of the first, second, and third computers 102a, 102b, 102c for the embodiment shown in FIGS. 1 and 5. Then, each distributed computing device would again have the opportunity to provide their own semantic local definition for the fifth node 608e and for the cluster associated with same, to accept a label or name that was provided by the aggregator for the fifth node 608e, or to choose no name for the fifth node 608e, which may be advantageous when a local computing device has no samples which fall within the cluster associated with the fifth node 608e.

In the embodiment described above with respect to FIGS. 5 and 6, the sample data fed into and recognized by the federated learning system include images of animals. In an alternative embodiment which recognized simple audio phrases spoken, the principles for following the process 200 shown in FIG. 2 would be similar Parties in a federated learning system with enhanced semantic learning that recognizes audio phrases may divide phrases into groups of questions, greetings, insults, or complements. Different parties may determine the same audio phrase spoken to be an insult, a greeting, or a complement, depending on a cultural background or a cultural environment in which the particular participant/party operates. Individual parties and an aggregator may work together to perform steps 202 to 228 with respect to forming clusters and classes and a deep learning model for the determination of the type of audio phrase and with nodes corresponding to the clusters identified. The system may rely on tone recognition as well as on speech-to-text conversion to generate the vectors about particular audio phrases spoken and recorded and to analyze the audio phrases spoken. The process 200 may also be applied to predictive typing for words into computing devices such as a personal computer or a smart phone. For analyzing text or voice data, a method such as word2vec may be implemented to map the raw data to numerical vectors so that the neural networks can understand and analyze the data.

It may be appreciated that FIGS. 2-6 provide only illustrations of certain embodiments and do not imply any limitations with regard to how different embodiments may be implemented. Many modifications to the depicted embodiment(s) may be made based on design and implementation requirements.

As described in embodiments above, the federated learning program 110a, 110b, 110c, 110d enhanced with semantic learning may improve the functionality of a computer or a system of computers by allowing training of a deep learning system to occur with more accuracy while also improving the learning system agility and reducing required computing power for adding model classes and while more efficiently coordinating federated learning.

Figure 7:
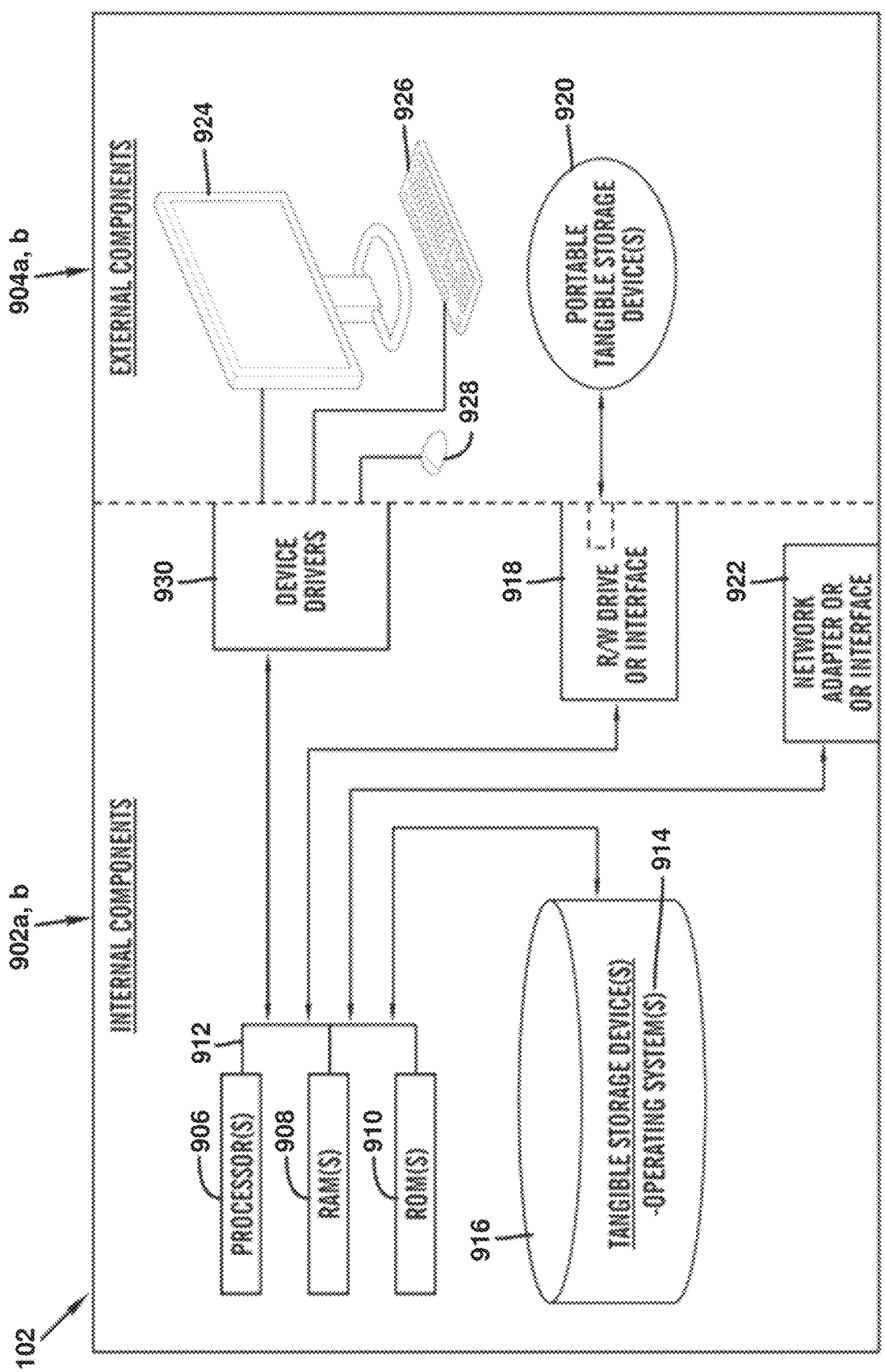
FIG. 7 is a block diagram of internal and external components of computers and servers depicted in FIG. 1 according to at least one embodiment.

FIG. 7 is a block diagram 900 of internal and external components of computers depicted in FIG. 1 in accordance with an illustrative embodiment of the present invention. It should be appreciated that FIG. 7 provides only an illustration of one implementation and does not imply any limitations with regard to the environments in which different embodiments may be implemented. Many modifications to the depicted environments may be made based on design and implementation requirements.

Data processing system 902, 904 is representative of any electronic device capable of executing machine-readable program instructions. Data processing system 902, 904 may be representative of a smart phone, a computer system, PDA, or other electronic devices. Examples of computing systems, environments, and/or configurations that may represented by data processing system 902, 904 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 and network server 112 may include respective sets of internal components 902 a, b and external components 904 a, b illustrated in FIG. 7. Each of the sets of internal components 902 a, b includes one or more processors 906, one or more computer-readable RAMs 908 and one or more computer-readable ROMs 910 on one or more buses 912, and one or more operating systems 914 and one or more computer-readable tangible storage devices 916. The one or more operating systems 914, the software program 108, and the federated learning programs 110a, 110b, 110c in first, second, and third computers 102a, 102b, 102c, respectively, and the federated learning program 110d in network server 112, may be stored on one or more computer-readable tangible storage devices 916 for execution by one or more processors 906 via one or more RAMs 908 (which typically include cache memory). In the embodiment illustrated in FIG. 7, each of the computer-readable tangible storage devices 916 is a magnetic disk storage device of an internal hard drive. Alternatively, each of the computer-readable tangible storage devices 916 is a semiconductor storage device such as ROM 910, EPROM, flash memory or any other computer-readable tangible storage device that can store a computer program and digital information.

Each set of internal components 902 a, b also includes a R/W drive or interface 918 to read from and write to one or more portable computer-readable tangible storage devices 920 such as a CD-ROM, DVD, memory stick, magnetic tape, magnetic disk, optical disk or semiconductor storage device. A software program, such as the software program 108 and the federated learning program 110a, 110b, 110c, 110d can be stored on one or more of the respective portable computer-readable tangible storage devices 920, read via the respective RAY drive or interface 918 and loaded into the respective hard drive 916.

Each set of internal components 902 a, b may also include network adapters (or switch port cards) or interfaces 922 such as a TCP/IP adapter cards, wireless wi-fi interface cards, or 3G or 4G wireless interface cards or other wired or wireless communication links. The software program 108 and the federated learning program 110a, 110b, 110c in first, second, and third computers 102a, 102b, 102c and the federated learning program 110d in network server computer 112 can be downloaded from an external computer (e.g., server) via a network (for example, the Internet, a local area network or other, wide area network) and respective network adapters or interfaces 922. From the network adapters (or switch port adaptors) or interfaces 922, the software program 108 and the federated learning programs 110a, 110b, 110c in first, second, and third computers 102a, 102b, 102c, respectively, and the federated learning program 110d in network server computer 112 are loaded into the respective hard drive 916. The network may comprise copper wires, optical fibers, wireless transmission, routers, firewalls, switches, gateway computers and/or edge servers.

Each of the sets of external components 904 a, b can include a computer display monitor 924, a keyboard 926, and a computer mouse 928. External components 904 a, b can also include touch screens, virtual keyboards, touch pads, pointing devices, and other human interface devices. Each of the sets of internal components 902 a, b also includes device drivers 930 to interface to computer display monitor 924, keyboard 926 and computer mouse 928. The device drivers 930, R/W drive or interface 918 and network adapter or interface 922 comprise hardware and software (stored in storage device 916 and/or ROM 910).

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 8:
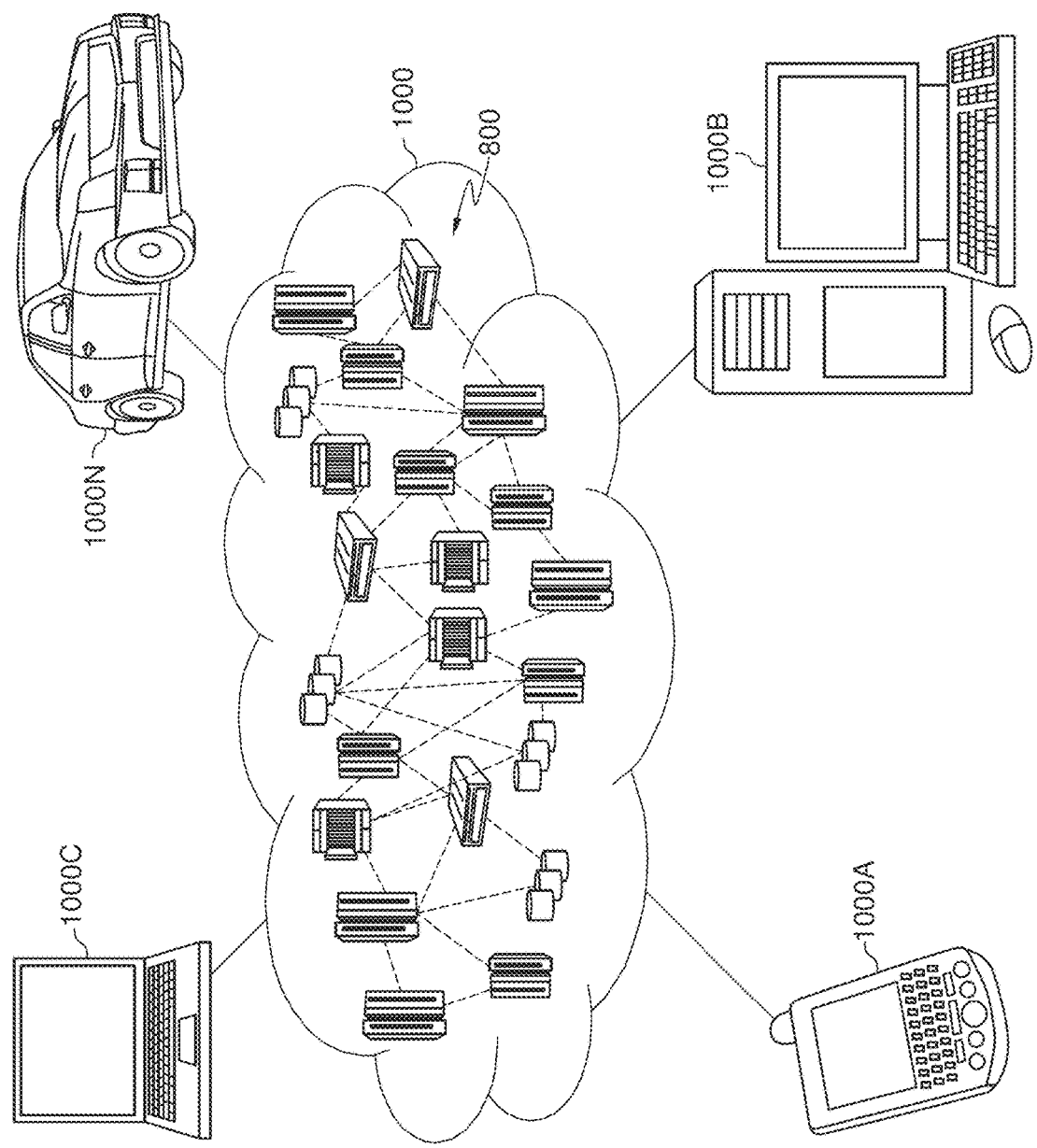
FIG. 8 is a block diagram of an illustrative cloud computing environment including the computer system depicted in FIG. 1, in accordance with an embodiment of the present disclosure.

Referring now to FIG. 8, illustrative cloud computing environment 1000 is depicted. As shown, cloud computing environment 1000 comprises one or more cloud computing nodes 800 with which local computing devices used by cloud consumers, such as, for example, personal digital assistant (PDA) or cellular telephone 1000A, desktop computer 1000B, laptop computer 1000C, and/or automobile computer system 1000N may communicate. Nodes 800 may communicate with one another. They may be grouped (not shown) physically or virtually, in one or more networks, such as Private, Community, Public, or Hybrid clouds as described hereinabove, or a combination thereof. This allows cloud computing environment 1000 to offer infrastructure, platforms and/or software as services for which a cloud consumer does not need to maintain resources on a local computing device. It is understood that the types of computing devices 1000A-N shown in FIG. 8 are intended to be illustrative only and that computing nodes 800 and cloud computing environment 1000 can communicate with any type of computerized device over any type of network and/or network addressable connection (e.g., using a web browser). The cloud computing nodes 800 may have the similar or same structure and internal and external components as the client computer 102 shown in FIG. 7 and as the computers 102a, 102b, 102c shown in FIG. 1.

Figure 9:
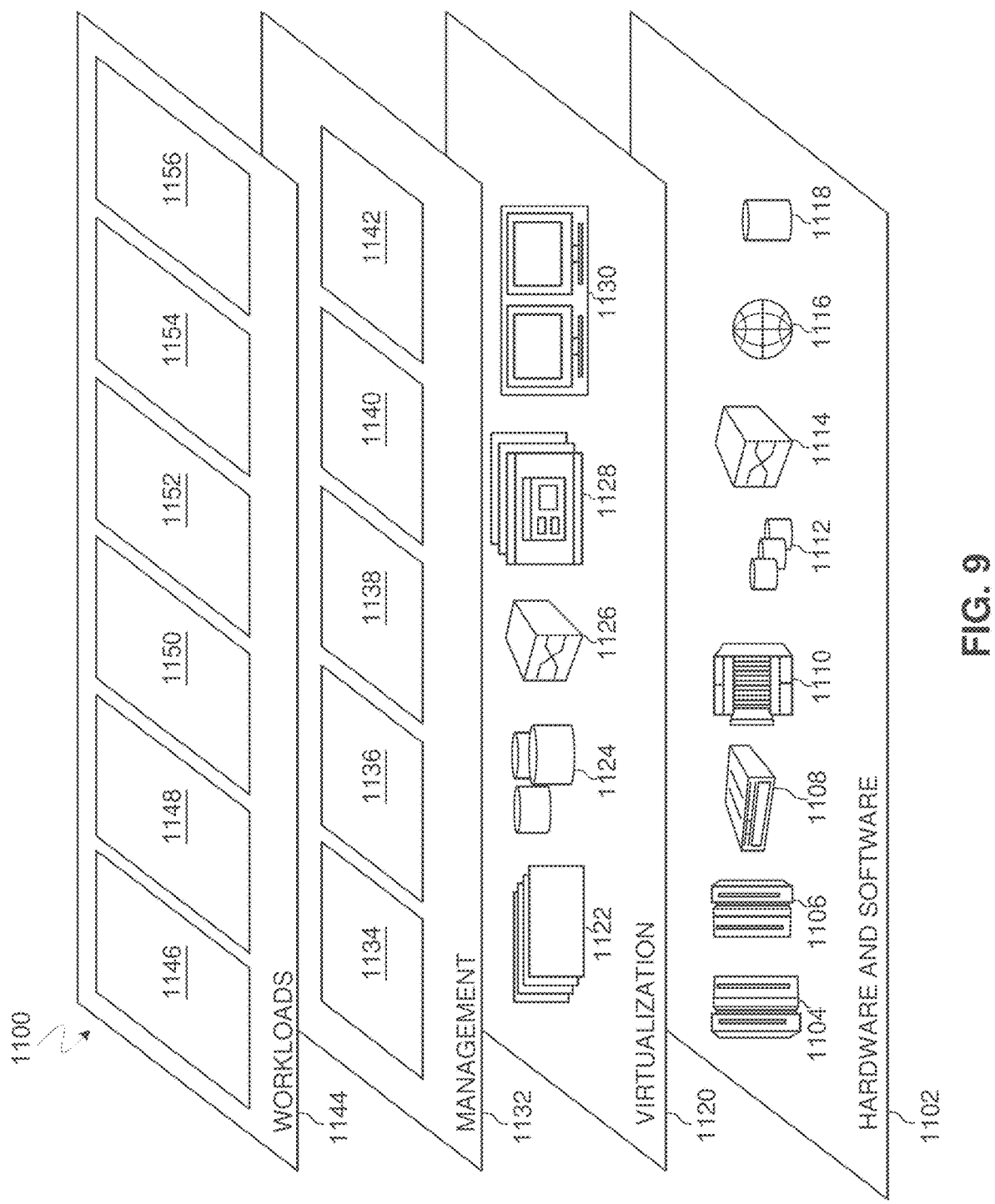
FIG. 9 is a block diagram of functional layers of the illustrative cloud computing environment of FIG. 7, in accordance with an embodiment of the present disclosure.

Referring now to FIG. 9, a set of functional abstraction layers 1100 provided by cloud computing environment 1000 is shown. It should be understood in advance that the components, layers, and functions shown in FIG. 9 are intended to be illustrative only and embodiments of the invention are not limited thereto. As depicted, the following layers and corresponding functions are provided:

Hardware and software layer 1102 includes hardware and software components. Examples of hardware components include: mainframes 1104; RISC (Reduced Instruction Set Computer) architecture based servers 1106; servers 1108; blade servers 1110; storage devices 1112; and networks and networking components 1114. In some embodiments, software components include network application server software 1116 and database software 1118.

Virtualization layer 1120 provides an abstraction layer from which the following examples of virtual entities may be provided: virtual servers 1122; virtual storage 1124; virtual networks 1126, including virtual private networks; virtual applications and operating systems 1128; and virtual clients 1130.

In one example, management layer 1132 may provide the functions described below. Resource provisioning 1134 provides dynamic procurement of computing resources and other resources that are utilized to perform tasks within the cloud computing environment. Metering and Pricing 1136 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 1138 provides access to the cloud computing environment for consumers and system administrators. Service level management 1140 provides cloud computing resource allocation and management such that required service levels are met. Service Level Agreement (SLA) planning and fulfillment 1142 provide pre-arrangement for, and procurement of, cloud computing resources for which a future requirement is anticipated in accordance with an SLA.

Workloads layer 1144 provides examples of functionality for which the cloud computing environment may be utilized. Examples of workloads and functions which may be provided from this layer include: mapping and navigation 1146; software development and lifecycle management 1148; virtual classroom education delivery 1150; data analytics processing 1152; transaction processing 1154; and semantic federated learning 1156. A federated learning program 110a, 110b, 110c, 110d provides a way to accurately perform federated learning even when dealing with unique semantic naming preferences for individual computing devices in the federated learning system.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises," "comprising," "includes," "including," "has," "have," "having," "with," and the like, when used in this specification, specify the presence of stated features, integers, steps, operations, elements, and/or components, but does not preclude the presence or addition of one or more other features, integers, steps, operations, elements, components, and/or groups thereof.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for federated learning, the method comprising:
   receiving, via an aggregator, cluster information from distributed computing devices, wherein the cluster information relates to identified clusters in sample data of the distributed computing devices and comprises centroid information per cluster, and wherein the aggregator comprises a processor;
   integrating, via the aggregator, the cluster information to define data classes for machine learning classification, wherein the integrating comprises computing a respective distance between centroids of the clusters in order to determine a total number of the data classes; and
   sending, via the aggregator, a deep learning model comprising an output layer comprising a total number of nodes equal to the total number of the data classes, and wherein the deep learning model is for the distributed computing devices to perform machine learning classification in federated learning.

2. The method according to claim 1, further comprising:
   providing, via the aggregator, an autoencoder to the distributed computing devices;
   running, via individual computing devices of the distributed computing devices, the sample data of the respective distributed computing devices through the autoencoder to produce autoencoder outputs;
   running, via the individual computing devices, the autoencoder outputs through a clustering algorithm to identify the clusters from the sample data; and
   sending the cluster information from the distributed computing devices to the aggregator.

3. The method according to claim 2, further comprising:
   sending by the aggregator an initial autoencoder to the distributed computing devices for execution;
   sequentially training, via the distributed computing devices, the initial autoencoder to generate the autoencoder; and
   sending the autoencoder from a last computing device of the distributed computing devices to the aggregator.

4. The method according to claim 3, wherein the sequential training comprises:
   training, via a first computing device of the distributed computing devices, the initial autoencoder to produce a partially trained autoencoder;
   sending the partially trained autoencoder from the first computing device to a second computing device of the distributed computing devices;
   training, via the second computing device, the partially trained autoencoder to produce a further trained autoencoder;
   sending the further trained autoencoder from the second computing device to an additional computing device; and
   training, via the additional computing device, the further trained autoencoder to produce the autoencoder, wherein the additional computing device is the last computing device.

5. The method according to claim 3, wherein the initial autoencoder is a pre-trained autoencoder.

6. The method according to claim 2, wherein the clustering algorithm is part of the autoencoder.

7. The method according to claim 1, further comprising:
   performing the federated learning via the deep learning model and via the distributed computing devices.

8. The method according to claim 7, further comprising:
   checking, via a first computing device of the distributed computing devices, for a new class during the federated learning, wherein the checking comprises the first computing device feeding a new sample to an autoencoder and performing an anomaly detection to detect the new sample deviating from the data classes, and wherein the deviating exceeds a pre-defined threshold.

9. The method according to claim 8, further comprising:
   notifying, via the first computing device, the aggregator regarding the deviating;
   adding, via the aggregator, a new data class to the data classes to form a new set of data classes, wherein the new class corresponds to the new sample;
   sending, from the aggregator to the distributed computing devices, the new set of data classes; and
   performing additional federated learning, via the aggregator and the distributed computing devices, to further train the deep learning model, wherein the performing of the additional federated learning includes using the new set of data classes as new nodes of the output layer of the deep learning model.

10. The method according to claim 1, wherein the cluster information comprises radius information per cluster, and wherein the integrating further comprises checking for radius overlap of the clusters, two clusters having radius overlap being consolidated to a single cluster to determine the total number of the data classes.

11. The method according to claim 1, wherein the aggregator consolidates two clusters to determine the total number of the data classes if the distance between the centroids of the two clusters is less than a pre-defined threshold.

12. The method according to claim 1, further comprising:
naming, via a computing device of the distributed computing devices, a first class of the data classes according to a semantic meaning for the computing device.

13. The method according to claim 1, further comprising:
anonymizing, via the distributed computing devices, the cluster information before the cluster information is sent to the aggregator.

14. A computer system for federated learning enhanced with semantic learning, the computer system comprising:
one or more processors, one or more computer-readable memories, one or more computer-readable tangible storage media, and program instructions stored on at least one of the one or more computer-readable tangible storage media for execution by at least one of the one or more processors via at least one of the one or more computer-readable memories, wherein the computer system is capable of performing a method comprising:
receiving cluster information from distributed computing devices, wherein the cluster information relates to identified clusters in sample data of the distributed computing devices and comprises centroid information per cluster;
integrating the cluster information to define data classes for machine learning classification, wherein the integrating comprises computing a respective distance between centroids of the clusters in order to determine a total number of the data classes; and
sending a deep learning model comprising an output layer comprising a total number of nodes equal to the total number of the data classes, and wherein the deep learning model is for the distributed computing devices to perform machine learning classification in federated learning.

15. The computer system according to claim 14, wherein the method further comprises:
providing an autoencoder to the distributed computing devices.

16. The computer system according to claim 15, wherein the autoencoder comprises a clustering algorithm.

17. The computer system according to claim 15, wherein the method further comprises:
sending an initial autoencoder to a first computing device of the distributed computing devices for execution;
receiving a partially trained autoencoder from the first computing device;
sending the partially trained autoencoder to a second computing device of the distributed computing devices;
receiving a further trained autoencoder from the second computing device;
sending the further trained autoencoder to an additional computing device of the distributed computing devices; and
receiving the autoencoder from the additional computing device.

18. The computer system according to claim 14, wherein the cluster information comprises radius information per cluster, and wherein the integrating further comprises checking for radius overlap of the clusters, two clusters having radius overlap being consolidated to a single cluster to determine the total number of the data classes.

19. The computer system according to claim 14, wherein two clusters are consolidated to determine the total number of the data classes if the distance between the centroids of the two clusters is less than a pre-defined threshold.

20. A computer program product for federated learning enhanced with semantic learning, the computer program product comprising a computer-readable storage medium having program instructions embodied therewith, the program instructions being executable by a processor to cause the processor to perform a method comprising:
receiving cluster information from distributed computing devices, wherein the cluster information relates to identified clusters in sample data of the distributed computing devices and comprises centroid information per cluster;
integrating the cluster information to define data classes for machine learning classification, wherein the integrating comprises computing a respective distance between centroids of the clusters in order to determine a total number of the data classes; and
sending a deep learning model comprising an output layer comprising a total number of nodes equal to the total number of the data classes, and wherein the deep learning model is for the distributed computing devices to perform machine learning classification in federated learning.

* * * * *